United States Patent [19]

Caine

[11] 4,274,006
[45] Jun. 16, 1981

[54] UNIVERSAL X-RAY FILM MARKER

[76] Inventor: Richard D. Caine, 13352 Sayre St., Sylmar, Calif. 91340

[21] Appl. No.: 112,947

[22] Filed: Jan. 17, 1980

[51] Int. Cl.³ .............................................. G03B 41/16
[52] U.S. Cl. .................................. 250/476; 250/475.1
[58] Field of Search .................. 250/475, 476; 40/615, 40/616

[56] References Cited

U.S. PATENT DOCUMENTS

| | | | |
|---|---|---|---|
| 2,071,912 | 2/1937 | Auer | 250/476 |
| 2,996,822 | 8/1961 | Souza | 40/616 |
| 3,518,428 | 6/1970 | Ring | 250/476 |
| 4,035,653 | 7/1977 | Karasko | 250/476 |
| 4,121,108 | 10/1978 | Manor | 250/476 |

Primary Examiner—Bruce C. Anderson
Attorney, Agent, or Firm—Poms, Smith, Lande & Rose

[57] ABSTRACT

A universal X-ray film marker is formed by taking a fairly thin sheet of transparent plastic, for example, ⅛th inch thick, and applying a colored layer or coating to one side of it, which will be the rear side of the X-ray marker. A tapered cutting tool in the order of a milling cutter, is then employed to cut recesses from the rear of the plate through the colored coating to form letters which are visible in their correct form from the front of the marker. After the recesses are formed, finally divided lead powder is mixed with a binder which may, if desired, include other material, and the recesses are filled with the mixture. Following drying, a thin layer of plastic material is secured over the back of the unit. The resulting tapered letters which have a relatively broad base toward the rear of the marker which will be adjacent the film may be used for all X-ray applications and gives a particularly clear and sharp image when used in tomography or in other X-ray applications where the angle of incidence of the X-rays on the film changes in the course of the exposure.

8 Claims, 6 Drawing Figures

PRIOR ART TOMOGRAPHY

UNIVERSAL X-RAY FILM MARKER

FIELD OF THE INVENTION

This invention relates to X-ray markers, and particularly to identification plates which may be used for tomography or other applications in which the angle of incidence of the X-rays on the X-ray film changes during the course of exposure.

BACKGROUND OF THE INVENTION

It is customary to use plates which have cast lead letters on them when X-ray films are exposed. For example, it is difficult to tell from an X-ray whether the left-hand or the right-hand, for example, is being X-rayed, and it often desirable to have other information such as the X-ray operator initials appear on the X-ray. Typical X-ray marking arrangements which have been proposed heretofore are disclosed in U.S. Pat. Nos. 2,071,912; 3,518,428 and 4,121,108. In general, solid lead letters have been used, with the attendant disadvantages of requiring the handling and casting of molten lead when unusual marking requirements arise. In one patent, U.S. Pat. No. 3,518,428, lead powder mixed with water is employed to form the letters, but in case of slight damage of the unit, leakage of the paste would occur with attendant inconvenience. In addition, most markers which have been proposed up to the present time have employed letters which are substantially rectangular in their cross-sectional configuration. In many cases, the markers are arranged so that the letters are spaced a substantial distance from the film. While such markers were adequate for X-ray techniques in which the X-rays were directed at a single angular orientation with respect to the film, they tend to produce blurred or fuzzy indications when employed in marking films where modern techniques using different angles of incidence of the X-rays on the film, such as tomography, are employed.

Accordingly, a principal object of the present invention is to provide a universal X-ray film marker which may be employed both for normal X-ray techniques and also for techniques in which the angle of incidence of the X-rays is changed in the course of an exposure.

Another object of the present invention is to provide a convenient and inexpensive technique for forming X-rays markers without the need for casting lead.

A still further object of the invention is to provide a X-ray marker which presents a good visual appearance, is solidly constructed, and which is relatively inexpensive to manufacture with any desired indicia.

SUMMARY OF THE INVENTION

In accordance with the present invention, a universal X-ray marker includes a plastic plate carrying letters which may be read from the front of the plate; and these letters are formed by recesses which form the outline of the letters extending into the plate from the rear of the plate, with the recesses being wider at the rear surface of the plate and tapering to a substantially narrower width at the end of each of the recesses near the front of the plate; and lead powder mounted in the recesses, with the lead powder being firmly secured in place by a hardened binder and with a final thin plastic layer secured to the back of the plate and covering the recess.

In accordance with a subordinate feature of the invention, the plastic plate may be initially provided with a colored coating on its back, so that when the recesses are cut through the colored coating and are filled with the lead powder, a sharp contrast arises between the colored background and the lead powder.

In accordance with another feature of the invention, the letters are cut using a tapered rotating cutting head.

In accordance with an additional feature of the invention, the backing layer covering the rear of the plate and overlying the recesses to secure the bands together.

In accordance with another feature of the invention, the backing layer of plastic which overlies the recess on the rear of the marker is relatively thin, in the order of 10 or 20,000ths of an inch, so that the powdered lead at the base of the letters or other indicia lies very close to the film on which it is taped or otherwise mounted when the X-ray exposure is being made.

Through the use of the letters or other indicia of tapered cross section with a larger base than the top of the letter, and the letters extending to substantially the rear of the marker, the sharpness and a definition of the edges of the indicia as they appear on the X-ray film is greatly increased as compared with prior arrangements, particularly when the angle of incidence of the X-rays changes in the course of the exposure. Another advantage of the present process is the case in preparing new and different letters, numbers, or other indicia, merely by cutting appropriate grooves in the plastic plates. No melting of hot lead or casting of the lead is required, with the attendant dangers and possibility of lead poisoning.

Other objects, features and advantages of the invention will become apparent from a consideration of the following detailed description and from the accompanying drawings.

DETAILED DESCRIPTION

Figure 1:
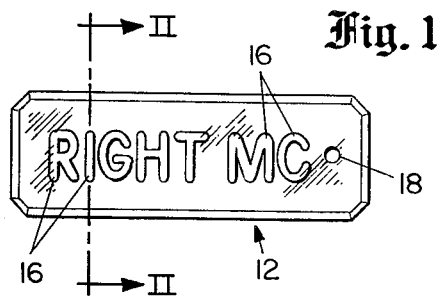
FIG. 1 is a top view of an X-ray marker illustrating the principles of the present invention.

Referring more particularly to the drawings, FIG. 1 is a top view of an X-ray marker plate 12 having a plastic body 14 and lettering 16 made essentially of lead powder. The X-ray marker may have a hole 18 through it to facilitate hanging storage.

The particular legend shown on the marker plate of FIG. 1 is "RIGHT MC". The designation "RIGHT" is employed to indicate whether the view is of the right or left hand or other portion of the body, while the letters "MC" are the initials of the operator.

Figure 2:
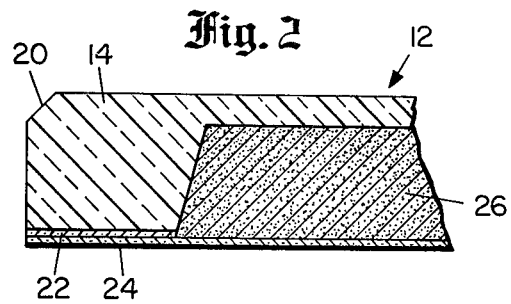
FIG. 2 is a partial cross sectional view to a greatly enlarged scale taken along lines II—II of FIG. 1.

FIG. 2 is a cross sectional view taken along lines II—II of FIG. 1 and extending from the top of the plate 12 part way along the length of the letter "I". In FIG. 2, the body 14 of the plate is made of plexiglass, and arcylic plastic material, it being understood that other plastic materials may of course be employed. The upper surface of the plate 12 is chamfered at 20 to avoid any sharp edges which might scratch the patients. At the lower surface of the plate 14 is a colored layer 22. This layer may be of the same material as the main portion of the acrylic or plexiglass plate 14 but is provided with pigment before being added to the plate 14.

The bottom layer 24 is a separate plastic layer which is added at the last step of the assembly through bonding it to the bottom of the plate.

Figure 4:
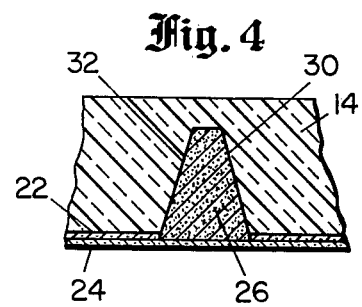
FIG. 4 is a cross sectional view taken along lines IV—IV of FIG. 3.
Figure 3:
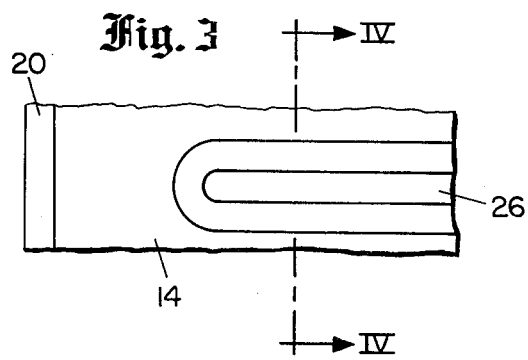
FIG. 3 is an enlarged top view of the end of one of the letters as shown in FIG. 1.

In the fabrication of the complete plate 12, the letters are initially formed from the rear of the plate by cutting through the colored layer 22, with a circular cutter having a cross-sectional configuration at its tip substantially as shown in FIG. 4. When viewed from the rear, of course the letters must be cut out in reverse format. After the letters have been cut out, fine lead powder having a consistency almost like flour, and which is available from major suppliers of lead, is mixed with a binder, or carrier, of the type used as a vehicle for paint. If desired, aluminum paint may be purchased, and the fine lead powder mixed with the aluminum paint until it has a consistency about like thick cream. The lead powder paste is then put into the grooves forming the letters and the excess is removed. The volatile material included in the binder then evaporates leaving a solidified mass, made up mostly of the lead powder in the grooves. In FIGS. 2, 3, and 4, the mass of hardened lead powder and binder is designated by the reference numeral 26. In fabrication, when certain binders are employed, there is a certain amount of shrinkage of the past during drying, and an additional coating of the paste is then added to fill up the grooves flush with the bottom of the plate 14. A second drawing step is then accomplished. Drying may be either accomplished in the ambient atmosphere, or by exposure to heat lamps or other sources of heat.

For reasons to be discussed in detail below, the sidewalls 30 and 32 of the grooves in which the lead powder is located are oriented at a relatively steep angle, such as about 70 or 75 degrees relative to the plane of the lower surface of the plate 14. It is to be understood of course that somewhat steeper or more shallow angles could be employed, for example, angles of between about 60 and 80 degrees being preferred, and angles from 45 degrees to 85 degrees may be utilized and still enjoy some of the advantages of the present invention.

Figure 5:
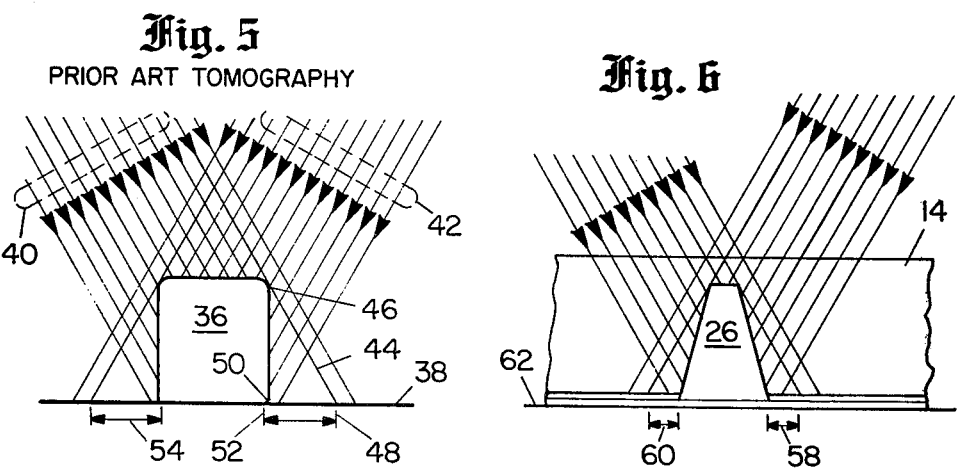
FIG. 5 is a diagram indicating the dispersion and fuzziness of the edge definitions when letters of rectangular cross-sectional configuration are employed.
Figure 6:
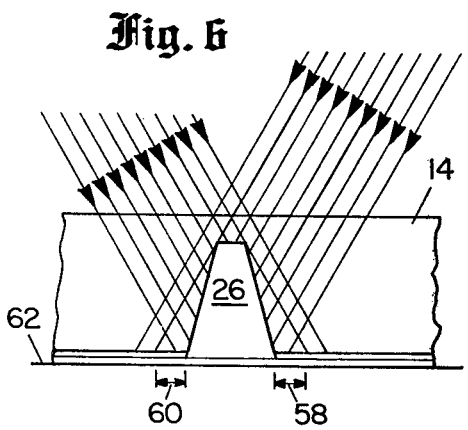
FIG. 6 is a cross-sectional view showing the lesser dispersion and increased clarity provided by markers in accordance with the present invention.

The advantages of the tapered letters or other indicia, in accordance with the present invention, will be brought out in connection with FIGS. 5 and 6. FIG. 5 shows a solid lead letter having a rectangular cross-section indicated by the reference numeral 36. In tomography, the angle of incidence of the X-rays relative to the film 38 changes substantially, and this is indicated by the two sets of rays 40 and 42. As indicated in FIG. 5, this angle may shift by 60 degrees or more between the initial orientation of the incoming X-rays 40 and the final orientation indicated by the rays 42. When the standard type of cast letter 36 having a rectangular cross section is employed, the outline of the lettering on the X-ray film 38 may be very blurry and fuzzy. The reason for this blurring or fuzziness is apparent from a consideration of the ray 44 which just clears the corner 46 of the letter 36, and impinges on the film 38 at line 48, as compared with the image formed by the lower corner 50, which results in the line 52 on film 38. The distance between the lines 48 and 52 represents the fuzziness or blurred outline of the letter 36 on the film. Similarly, the zone 54 to the left of the letter 36 represents a blurred region formed by the left hand side of letter 36.

On the other hand, using the element 26 with tapered sidewalls, as shown in FIG. 6, the blurred or fuzzy areas at the edges of the letters are greatly reduced to the regions 58 and 60, on the film 62. In practice, this great reduction in fuzziness and greatly increased sharpness and clarity of the indicia on the film makes the difference between easily readable legends and almost undecipherable legends in many cases, on the film, for tomographic and similar X-ray procedures.

Incidentally, returning to the method of constructing the plate of FIGS. 1 through 4, after the lead powder and the binder have hardened and are flush with the lower surface of the plate 14, the thin layer 24 which seals the bottom of the unit is bonded to the bottom of the plate. This may be accomplished by the use of a very thin layer of acrylic material which is preferably opaque, and by dipping it a solvent for the materials 24 and 14 prior to affixing it to the bottom of plate 14. One suitable solvent is methyl ethyl ketone (MEK). Instead of the use of such a solvent, any good plastic cement, glue, or bonding material may be employed.

In addition to the increased clarity of the images on the film as discussed above in connection with FIGS. 5 and 6, the X-ray marker plates of the present invention have a number of other advantages. Specifically, as compared with prior arrangements in which solid lead letters were formed, when a new style of marker plate is desired, it is not necessary to make new molds, but the operator cutting the letters merely has to follow a new guide or a new pattern. Also, the poisonous lead fumes, and the other disadvantages of handling molten lead are avoided.

One of the references mentioned above, U.S. Pat. No. 3,518,428 granted June 30, 1970, discloses letters of rectangular cross sectional configuration, and raised well above the back of the plate, and made of lead powder in a water paste. The unit has many problems not found in the device of the invention, including very poor dispersion effects under conditions as shown in FIGS. 5 and 6 of the present drawings, in view of the substantial elevation of the rectangular letters above the back of the plate, and thus above the X-ray film. It is also noted that the cross sectional configuration of the letters are rectangular rather than tapered as disclosed herein. In addition, the use of a water paste raises the possibility of a mess, and impairment of the light blocking properties of the unit in the event of hard usage, cracking or the like.

As mentioned above, any suitable binder which will harden fairly rapidly may be employed with the lead powder. In one successful composition, the lead powder was added to aluminum paint, as noted above, to form a heavy cream-like consistency. The resultant letter included the optically brighter flakes of aluminum, in addition to the lead powder which is opaque to X-ray. Accordingly, the resultant marking plates had improved visual appearance as compared with plates in which plain lead powder was employed. It is also noted that, when the backing layer 22 at the bottom of the principle acrylic plate 14 was read in color, a good visual contrast is obtained between the silvery letters and the red backing layer. In general, some color should be selected for the background 22 which will contrast sharply with the color of the lead powder.

In closing, it is to be understood that the present invention is not limited to that precisely as shown and described herein. Instead of letters having a side angle of approximately 75 degrees as shown, any desired angle from about 45 degrees up to about 85 degrees may be employed, as mentioned hereinabove. Also, the use of powdered materials other than lead which are opaque to X-ray is also comtemplated. Instead of the acrylic material, the body of the plate may be made of any other material which is transparent both to X-rays and to visible light. Accordingly, the present invention is not limited to the exact embodiment shown and described herein.

What is claimed is:

1. An X-ray film indentification plate of universal applicability including tomographic and other applications where there is a change in the angle of incidence of the X-rays on the film, comprising:
    a plastic plate carrying letters which may be read from the front of said plate, said plate being substantially transparent;
    recesses forming the outline of said letters extending into said plate from the rear of said plate, and recesses being wider at the rear surface of said plate and tapering to a substantially narrower width at the end of each said recess near the front of said plate;
    lead powder mounted in said recesses;
    means including a hardened binder material firmly securing said lead powder into letter form in said recesses; and
    a thin plastic layer secured to and covering the back of said plate.

2. An X-ray identification plate as defined in claim 1 wherein said identification plate has a colored backing layer which contrasts sharply with the color of said lead powder.

3. An X-ray film identification plate as defined in claim 1 wherein the tapered sides of said recesses make an angle in the order of 60 degrees to 80 degrees with the upper and lower surface of said plate.

4. An X-ray film identification plate as defined in claim 1 wherein the sidewalls of said recesses make an angle in the order of between 45 degrees and 85 degrees, with the top and bottom surfaces of said plate.

5. An X-ray film identification plate as defined in claim 1 wherein the ends of said recesses are circular in configuration when viewed transverse to the surface of said plate.

6. An X-ray film identification plate as defined in claim 1 wherein said lead powder is mixed with metallic powder of another metal having greater reflectivity than lead, whereby the visual appearance of said identification plate is increased in brightness.

7. An X-ray film identification plate of universal applicability including tomographic and other applications where there is a change in the angle of incidence of the X-rays on the film, comprising:
    a plastic plate carrying letters which may be read from the front of said plate, said plate being substantially transparent;
    recesses forming the outline of said letters extending into said plate from the rear of said plate, said recesses being wider at the rear surface of said plate and tapering to a substantially narrower width at the end of each said recess near the front of said plate, the sidewalls of said recesses making an angle in the order of between 45 degrees and 85 degrees, with the top and bottom surfaces of said plate;
    lead powder mounted in said recesses;
    means including a hardened binder material firmly securing said lead powder into letter form in said recesses;
    a thin opaque plastic layer secured to and covering the back of said plate, said layer being of a color which contrasts sharply with the color of said lead powder; and
    the ends of said recesses being circular in configuration when viewed transverse to the surface of said plate.

8. An X-ray film identification plate as defined in claim 7 wherein said lead powder is mixed with metallic powder of another metal having greater reflectivity than lead, whereby the visual appearance of said identification plate is increased in brightness.

* * * * *